United States Patent [19]
Ikeda

[11] 4,084,904
[45] Apr. 18, 1978

[54] OPTICAL COPYING APPARATUS
[75] Inventor: Hiroshi Ikeda, Aichi, Japan
[73] Assignee: Minolta Camera Kabushiki Kaisha, Osaka, Japan
[21] Appl. No.: 705,744
[22] Filed: Jul. 15, 1976
[30] Foreign Application Priority Data
  Aug. 1, 1975 Japan .............................. 50-94496
[51] Int. Cl.² .................... G03B 27/70; G03G 15/28
[52] U.S. Cl. ........................................ 355/66; 355/8
[58] Field of Search ............... 355/3 R, 11, 8, 47–51, 355/66

[56] References Cited
U.S. PATENT DOCUMENTS

| 2,940,358 | 6/1960  | Rosenthal      | 355/66   |
| 3,052,155 | 9/1962  | Hurin et al.   | 355/11 X |
| 3,493,299 | 2/1970  | Hazelton       | 355/11   |
| 3,498,713 | 3/1970  | Schlegel et al.| 355/66   |
| 3,574,459 | 4/1971  | Hartwig et al. | 355/66   |
| 3,992,093 | 11/1976 | Jakobson       | 355/8 X  |

OTHER PUBLICATIONS
I.B.M. Technical Disclosure Bulletin, H. Medley Electrophotographic Copier, vol. 9 No. 11, 4/1967, p. 1522.

Primary Examiner—Donald A. Griffin
Attorney, Agent, or Firm—Wolder & Gross

[57] ABSTRACT

A slit-scanning type optical copying apparatus, wherein successive increments of the surface of an original are scanned by reciprocating an original-carrying support or an original-image scanning mirror, so that an original image is focused on a photosensitive member moving or turning at a given speed or at a given R.P.M. in a given direction, through a projecting optical system including an objective lens. In this optical copying apparatus, the projecting optical system comprises: a single objective lens; a roof reflecting member having adjoining reflecting surfaces making a right angle therebetween, the aforesaid reflecting member being positioned in the rear of the objective lens; a single half-mirror positioned in the optical path in the front of the objective lens and oriented to direct projecting beams from the original onto the lens and to direct projecting beams from the lens onto the photosensitive member, respectively; and means for turning the reflecting member through an angle of 90° in response to the advancing and returning movements of the original carrying support or original-image scanning mirror.

9 Claims, 10 Drawing Figures

OPTICAL COPYING APPARATUS

BACKGROUND OF THE INVENTION

This invention relates to a slit-scanning type optical copying apparatus, in which successive increments of the surface of an original are scanned by reciprocating an original carrying member such as an original support, an original carrier sheet and the like, or an original-image scanning mirror, so that an original image is focused on a photosensitive member moving or rotating at a given speed or at a given R.P.M. in a given direction, through a projecting optical system including an objective lens.

The prior art slit-scanning type optical copying apparatus poses a problem that because of a given direction of movement or rotation of a photosensitive member, a desired correct image may not be obtained during one of the reciprocal travels of the original-carrying support or the original-image scanning mirror.

As a result, the presently known copying apparatus of this type fails to produce copies during both the advancing and returning travels of the support or mirror, so that reproduction is effected only during one of the aforesaid advancing and returning travels, for instance, during the advancing travel of an original carrying member or an original-image scanning mirror. Thus, the other travel in the direction opposite thereto serves only as a return travel of the support or mirror in preparation for the next reproduction, thus effecting a lowered copying efficiency.

U.S. Pat. No. 3,574,459 and German Offenlegungsschrift No. 2,358,370 propose mechanisms for avoiding the foregoing shortcomings by providing reproduction which may be effected during both reciprocal travels of the original support. U.S. Pat. No. 3,574,459 uses a projecting optical system including a pair of objective lenses and a single Abbe prism positioned between the lenses, and the Abbe prism is turned through an angle of 90° in response to the advancing and returning travels of the support, thus enabling reproductions during both reciprocal travels of the support.

On the other hand, German Offenlegungsschrift No. 2,358,370 uses a projecting optical system including a single objective lens and two mirrors or prisms of a triangular cross section, which are positioned in the rear of the aforesaid lens and have different reflecting angles, with the direction of one of the mirrors or prisms being perpendicular to that of the other, whereby the two mirrors or prisms alternately intercept the optical path of the lens in response to reciprocal travels of the support, thus achieving reproductions during both reciprocal travels of the support.

With the former proposed mechanism, a reflecting member is used for dual purposes of reciprocal movements and reflection and thus is superior to the latter in that the reflecting member alone is simply turned through an angle of 90°. However, this suffers from a shortcoming in that the volume of the reflecting member or Abbe prism is relatively bulky and two objective lenses have to be used, thus resulting in complex construction and failure in providing a compact arrangement.

On the other hand, the latter proposed mechanism is superior to the former in that the reflecting members, i.e., mirrors or prisms having triangular cross sections are of a smaller volume, but pose the problem that two reflecting members must be selectively used.

In short, the prior art attempts necessarily use two objective lenses or two reflecting members having triangular cross sections, thus resulting in complexity of the projecting optical system and an increase in the space required therefor, coupled with an increase in manufacturing cost, as compared with presently available copying apparatuses.

SUMMARY OF THE INVENTION

It is an object of the present invention to provide a slit-scanning type optical copying apparatus, which enables reproduction during both reciprocal travels of a support or a scanning mirror, hereinafter referred to as reciprocal reproductions, without using a projecting optical system of a complicated construction and increasing the space required therefor, as compared with the prior art copying apparatus which effects one-direction reproduction.

It is another object of the present invention to provide a slit-scanning type optical copying apparatus, which enables reciprocal reproductions by means of a single objective lens and a single reflecting member having a triangular cross section.

To attain these objects and features of the present invention there is provided a slit-scanning type optical copying apparatus, in which a single reflecting member having a triangular cross section is placed in the rear of a single objective lens, and a single half-mirror is placed in an optical path in the front of the lens, whereby the reflecting member is turned through an angle of 90° in response to the advancing and returning travels of the support or scanning mirror.

More specifically, according to the present invention, there is provided a slit-scanning type optical copying apparatus, wherein successive increments of the surface of an original are scanned by reciprocating an original carrying support or an original-image scanning mirror, so that an original image is focused on a photosensitive member or substrate moving or turning at a given speed or at a given R.P.M. in a given direction, through a projecting optical system including an objective lens, the aforesaid apparatus characterized by: a single objective lens; a roof reflecting member having adjoining reflecting surfaces making a right angle therebetween, the reflecting member being positioned in the rear of the objective lens; a single half mirror positioned in the optical path and in the front of the objective lens and oriented to direct projecting beams from the original onto the lens and to direct projecting beams from the lens onto the photosensitive member, respectively; and means for turning the reflecting member through an angle of 90° in response to the advancing and returning travels of the original carrying support or original-image scanning mirror.

The above and other objects and features of the present invention will be apparent from a reading of the following description taken in conjunction with the accompanying drawings which illustrate embodiments of the present invention.

BRIEF DESCRIPTION OF THE DRAWINGS

FIGS. 2 (b) and (c) are diagrammatic views illustrative of the relationship between an original image and a projected image, when the in-prism lens is turned through an angle of 90°;

FIG. 2 (d) is a diagrammatic view illustrative, for comparison purposes, of the relationship between an original image and a projected image, when there is used a mirror lens incorporating a flat mirror;

DESCRIPTION OF THE PREFERRED EMBODIMENTS

Figure 1:
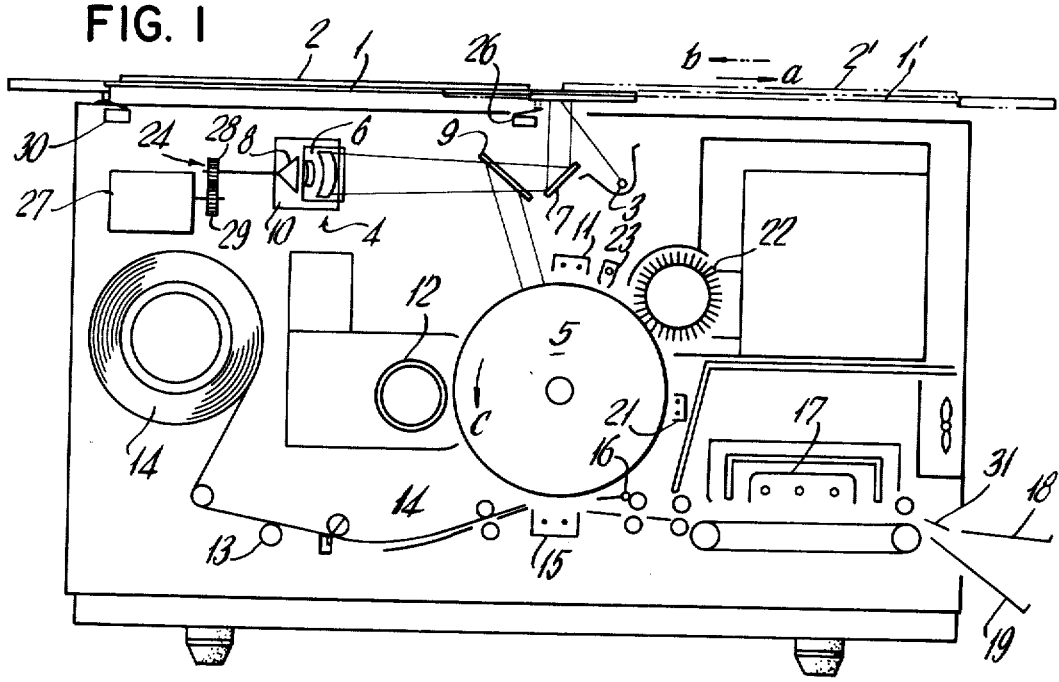
FIG. 1 is a side elevational view illustrative of one embodiment of an optical copying apparatus according to the present invention.
Figure 2A:
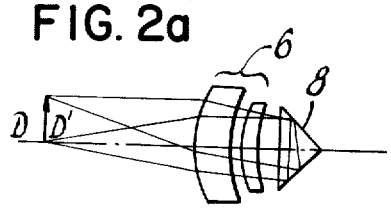
FIG. 2 (a) is a diagrammatic view illustrative of the principle of projection by the in-prism lens used in the projecting optical system according to the present invention.
Figure 2B:
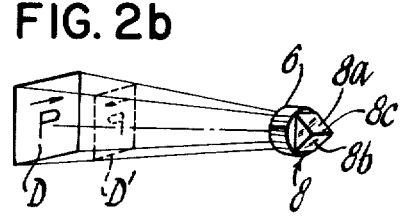
Figure 2C:
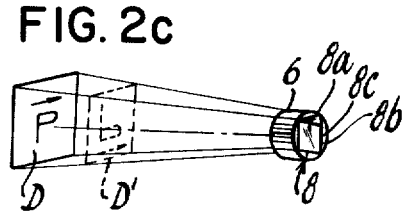
Figure 2D:
Figure 3A:
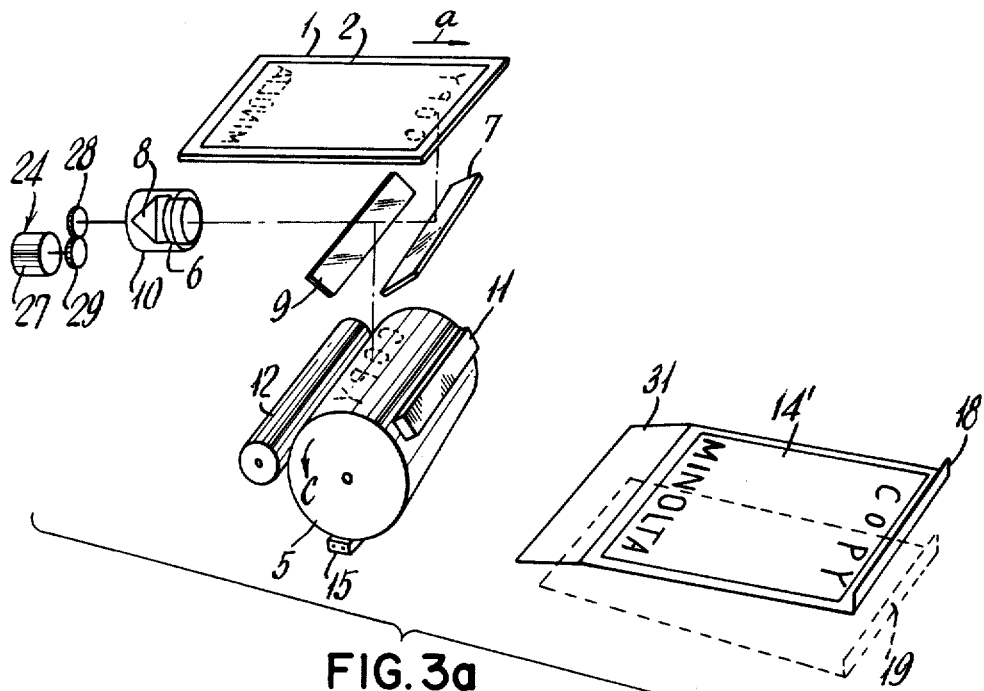
FIGS. 3 (a) and (b) are perspective views showing essential parts of the copying mechanism during the advancing and returning travels of the original support.
Figure 3B:
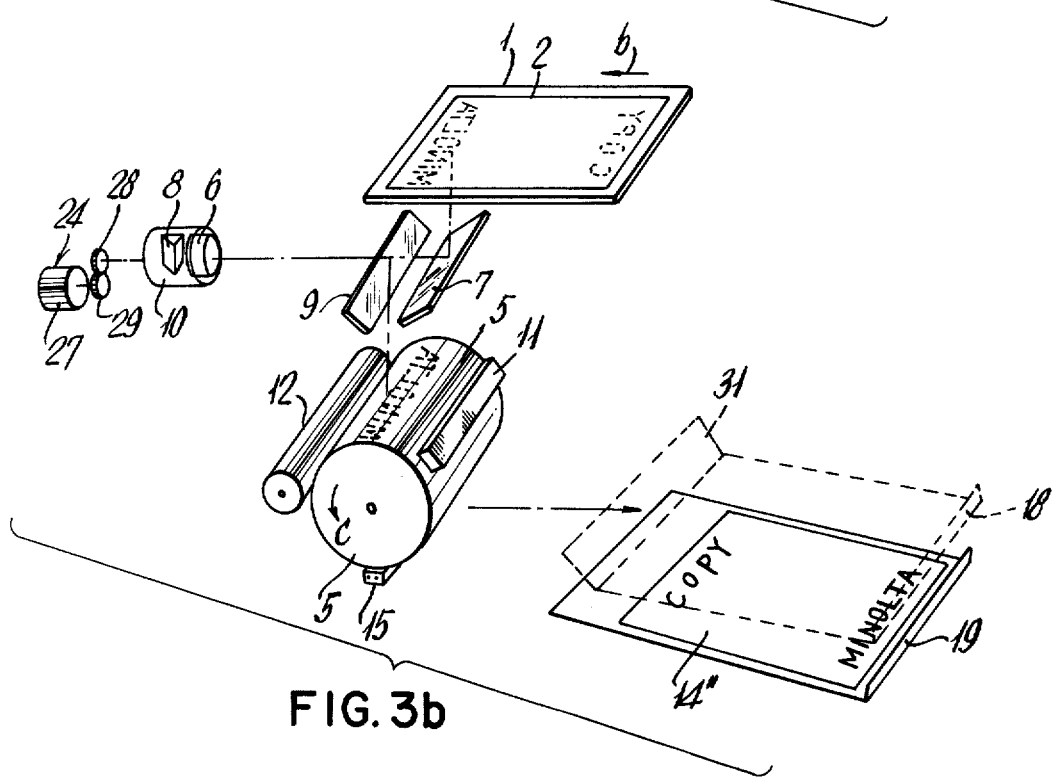

Referring now to the drawings, particularly FIGS. 1 to 3 thereof, which illustrate a preferred embodiment of the present invention as applied to a support-movable type optical copying apparatus, an original 2 is carried on an original support 1 and effects reciprocal movements in the directions $a$ and $b$ at a given speed. Shown at 3 is a stationary light source which illuminates successive increments of the moving original 2 so that successive increments of an original image are slit-exposed on a photosensitive drum 5 which is rotating at a given R.P.M. in a given direction $c$, and the successive increments of the original image are focused on the photosensitive drum 5, through a projecting optical system 4.

The projecting optical system consists of a lens group 6 for use in focusing, a stationary reflecting mirror 7 oriented and positioned to reflect the projecting beams from the original onto the lens group 6, a right-angled prism 8 oriented and positioned to direct the projecting beams traversing the lens group 6, back again to the lens group 6, and a half-mirror 9 oriented and positioned to direct the projecting beams, which have eventually passed through the lens group 6, onto the photosensitive drum 5, while the lens group 6 and prism 8 form the so-called in-prism lens, in which a prism and lenses are housed in a casing 10.

The photosensitive drum 5 has a film of Se, ZnO or CdS, and is such as is used in the conventional electrographic reproducing apparatus. The photosensitive drum 5 is charged by means of a charger 11 immediately before exposure, and the electrostatic latent image formed thereon consequent to the aforesaid exposure thereof is toner-developed by a developing device 12. Then a copy sheet 14 provided in a roller form is fed by a sheet feeding roller 13 to the photosensitive drum 5, where the toner image is transferred from the photosensitive drum onto the copy sheet 14 by means of a transfer charger 15, after which the sheet 14 is separated from the photosensitive drum 5 with the aid of a separating finger 16. Then, the sheet 14 passes through a toner image fixing device 17 to a tray 18 or 19, thus completing reproduction.

Meanwhile, the rolled copy sheet 14 is severed to the same length as that of the original 2 by means of a cutter 20 so as to be delivered into the tray 18 or 19.

The toner on the photosensitive drum 5 is removed by an erasing charger 21 and a cleaning means 22, after the copy sheet 14 has been separated from the drum 5, while charges remaining on the drum 5 are erased by an eraser 23.

The right-angled prism 8 in the projecting optical system 4 is so supported as to rotate through an angle of 90° each time in a given direction, in cooperation with the lens group 6, by means of a rotating mechanism 24 connected to the casing 10 and in response to the advancing and returning travels of the original support 1. FIG. 2 (a) shows the principle of projection when the prism 8 is used. As shown in FIG. 2 (b), a projected image D' is the horizontally reversed replica of an original image D, and in FIG. 2 (c), a projected image D' is the vertically inversed replica of the original image D, because the projected image D' is reversed in the direction of the prism edge 8c which is defined by the intersection of the right angle reflecting surfaces 8a and 8b.

The above functions are unique with a prism, in contrast to the functions of a flat mirror 20 as shown in FIG. 2 (d), in which the projected image D' is a horizontally reversed and vertically inversed replica of the original image D. The present invention utilizes the aforesaid unique functions of a prism.

In other words, with the presently available slit-scanning type optical copying apparatus, unless the direction of scanning of an original image according to movements of an original support or a mirror maintains a given relationship to the direction, in which successive increments of an original images are focused on a photosensitive member according to the aforesaid scanning, as well as to a reversed or inversed condition of a projecting image or to the presence and absence of such a condition, a normal image may not be projected on the photosensitive member 5, and thus an abnormal reproduced image is obtained. For this reason, reproduction with the slit-scanning type copying operation is effected only when an original support or a mirror is moved in such a given direction which is governed by a projecting conditions dependent on the projecting system as well as by the direction of the moving photosensitive member.

In contrast thereto, according to the present invention, when an original support or mirror moves in such a direction which otherwise would have produced an abnormal reproduced image, the prism 8 is turned through an angle of 90° so as to reverse the projected image, thereby avoiding the abnormal reproduced image stemming from the unwanted direction of movement of the support or mirror. As a result, normal reproduced images may be obtained in either advancing or returning travels of the support or mirror.

In operation, when the original support 1 advances in the direction $a$, the photosensitive drum 5 rotates in the direction $c$ in synchronism therewith. In this respect, taking into consideration the relationship between the scanning direction of the original and the direction in which an electrostatic latent image is formed on the photosensitive drum 5 and which is dependent on the moving direction of the photosensitive drum 5, the right-angled prism 8 is so adjusted as to orient the edge 8c in the horizontal direction as shown in FIGS. 1 and 3, thereby providing a normal reproduced image.

When the original support 1 and the original 2 reach the positions shown by broken lines in FIG. 1, exposure for the first reproduction with the advancing travels of the support and original is completed, whereupon the support 1 and the original 2 cease moving due to actuation of a position-detecting switch 26. The direction of a reproduced image 14' obtained due to the aforesaid exposure is such as shown in FIG. 3 (a). At this time, a signal from the position-detecting switch 26 immediately starts a motor 27 which drives the rotating mechanism 24, so that the casing 10 mounting the in-prism lens is turned through an angle of 90° by way of gears 28, 29.

The aforesaid rotation of the casing 10 is effected for a period of time as short as about 0.1 second, when, for instance, a motor 27 providing 120 rpm is used and the rpm is increased at a rate of 5/4 by means of gears 28 and 29.

The second reproduction is effected by returning the original support 1 from a position shown by broken line in FIG. 1 in the direction b, with the direction of the right-angled prism 8 being changed from the aforesaid position through an angle of 90° due to the 90° turning of casing 10, i.e., with the edge 8c being directed vertically as shown in FIG. 3 (b). The second reproduction is commenced at a suitable time-interval after the completion of the preceding reproduction, so that there may be obtained a reproduced image 14" which is a normal reproduced image but has a direction opposite to that of a reproduced image obtained due to the advancing movement of the support 1.

When the original support 1 returns to its initial or home position after the second reproduction, the support ceases moving due to actuation of a position-detecting switch 30, whereupon the rotating mechanism 24 is operated, so that the right-angled prism 8 is turned through an angle of 90°, thus providing for the reproduction due to the subsequent advancing movement of the support 1.

Thereafter, the reciprocal reproduction due to the reciprocal travels of the support 1 is repeated, until a desired number of copies are taken.

The successive 90° turnings of the right-angled prism 8 may be effected in one direction, or in the alternate directions, for obtaining normal reproduced images through the prism 8.

In this manner, normal reproduced images may be obtained in either of advancing travel or returning travel of the support 1. However, the directions of reproduced images obtained will be opposite alternately. Thus, a direction-arranging operation may be required for the produced copies, if a number of copies are to be produced. In this connect, there are provided two trays 18, 19 adapted to receive copied sheets 14', 14". In addition, a tray selecting guide 31 is so designed as to assume two different positions, as shown in FIGS. 3(a), (b), in response to reproductions in the advancing and returning travels, so that copied sheets 14' arranged in one direction may be received in the tray 18, while copied sheets 14" arranged in an opposite direction may be received in the tray 19, thus simplifying direction-arranging operation.

Figure 4:
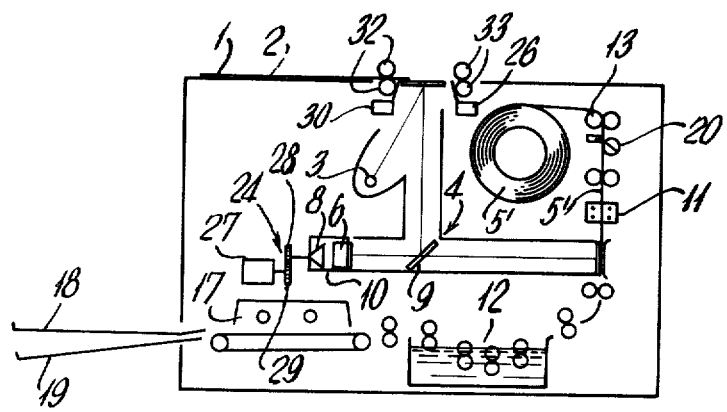
FIGS. 4 to 6 are side elevational views similar to FIG. 1 showing other embodiments of the present invention.

FIG. 4 shows a direct slit-exposure type optical copying apparatus, wherein an original carrier sheet 1' in place of the original support 1 is reciprocated by means of drive rollers 32, 33 and successive increments of a photosensitive sheet 5', i.e. a copy sheet, are directly subjected to slit-exposure. Like parts are designated like reference numerals in common with those given in FIG. 1, and any further description thereof is redundant and omitted. In operation, the original carrier sheet 1' actuates position-detecting switches 26, 30 so as to turn the right-angled prism 8 through an angle of 90°, thereby enabling the reciprocal reproductions.

The projecting optical system as shown in FIG. 4 is of the simplest construction.

Figure 5:
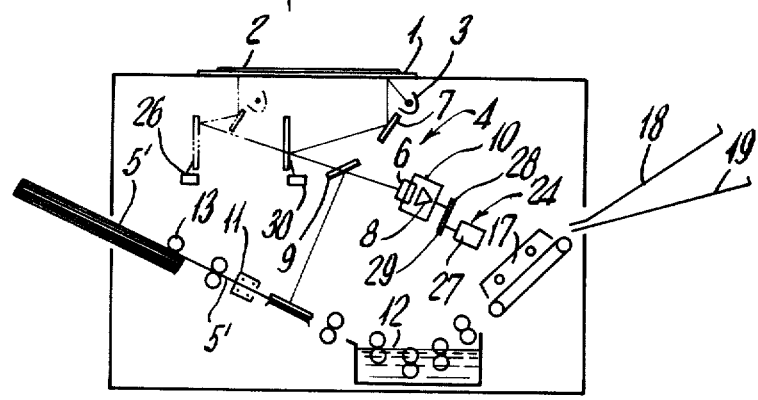
Figure 6:
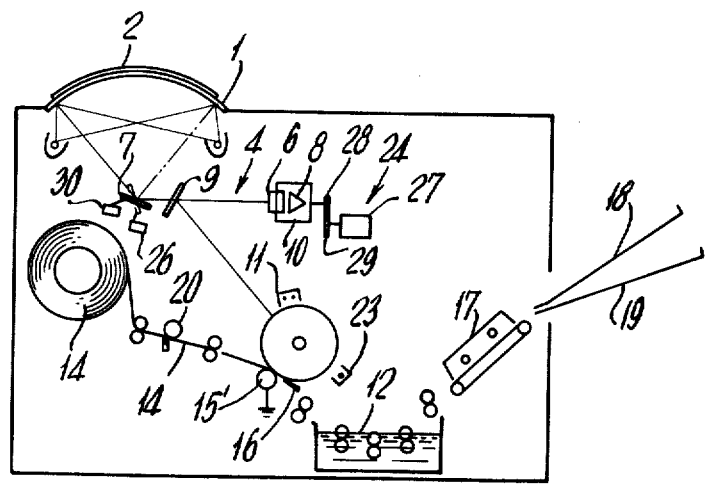

FIGS. 5 and 6 illustrate copying apparatuses, in which an original-image scanning mirror is reciprocated, and like parts are designated by like reference numerals in common with those given in FIG. 1, and further description thereof is omitted.

FIG. 5 shows a direct slit-exposure type optical copying apparatus, in which reflecting mirrors 7, 7' in the projecting optical system 4 are linearly reciprocated at speeds equal to and half the speed respectively of a photosensitive sheet 5', as well known, so that successive increments of a photosensitive sheet 5' may be subjected to slit-exposure. In this operation, the reflecting mirror 7' actuates position-detecting switches 26, 30 so as to turn the right-angled prism 9 through an angle of 90°, thereby enabling the reciprocal reproductions.

FIG. 6 shows an electrostatic latent image transfer type optical copying apparatus, wherein a reflecting mirror 7 in a projecting optical system 4 is reciprocally pivotally moved, so that successive increments of a photosensitive drum 5 may be subjected to slit-exposure. In this operation, position-detecting switches 26, 30 are actuated in response to the pivotal movements of the reflecting mirror 7 so as to turn a prism 8 through an angle of 90°, thereby enabling the reciprocal reproductions.

Shown at 15' in FIG. 6 is a known grounded electrode roller adapted to transfer an electrostatic latent image formed on a photosensitive member 5 onto a copy sheet 14.

While in the embodiments described above the right-angled prism 8 is turned in synchronism with lens group 6, it should be noted that the right-angled prism 8 may be rotated independently, while the lens group 6 is maintained stationary.

Alternatively, two mirrors assembled so as to be at a right angle to each other, that is, form a right dihedral angle, may be used in place of the right-angled prism.

While there have been described and illustrated preferred embodiments of the present invention it is apparent that numerous alterations, omissions and additions may be made without departing from the spirit thereof.

I claim:

1. In an optical copying apparatus having an original carrying support or an original-image scanning mirror for scanning successively the surface of an original by reciprocation, a projecting optical system including an objective lens, and a photosensitive member movable in a given direction on which an original image is focused through said optical system, wherein said optical system comprises:
    (a) a single objective lens;
    (b) a single roof reflecting member positioned in the rear of said objective lens and having adjoining reflecting surfaces making a right angle therebetween and turnable through an angle of 90° in response to the advancing and returning travels of said support or said scanning mirror; and
    (c) a single semireflector member positioned in the optical path in the front of said objective lens and oriented to direct projecting beams from said original onto said lens and to direct projecting beams from said lens onto said photosensitive member.

2. An optical copying apparatus as in claim 1, wherein said objective lens and said roof reflecting member are housed in a casing, whereby said lens is turned in synchronism with said reflecting member.

3. The optical copying apparatus of claim 2, wherein said roof reflecting member consists of a right-angled prism.

4. The optical copying apparatus of claim 2, wherein said roof reflecting member consists of two mirrors assembled at a right dihedral angle to each other.

5. An optical copying apparatus as in claim 1, wherein said roof reflecting member consists of a right-angled prism.

6. An optical copying apparatus as in claim 1, wherein said roof reflecting member consists of two mirrors assembled so as to give a right-angled cross section.

7. An optical copying apparatus as in claim 1, further comprising
(d) position-detecting switch means actuatable in response to the advancing and returning travels of said original carrying support or original-image scanning mirror; and
(e) means for turning said reflecting member through an angle of 90° actuating due to acutation of said switch means.

8. The optical copying apparatus as in claim 1, wherein said semireflector member comprises a half mirror.

9. A copying apparatus comprising means for supporting an original and for illuminating and scanning said original in opposite forward and reverse directions, a photosensitive substrate spaced from said original, a focusing lens member located along an optical axis between said original and said substrate, a single reflector member located across said optical axis proximate said lens member on the side thereof opposite to that of said original and said substrate along said optical axis, said reflector member including a pair of reflector surfaces forming a 90° dihedral angle with each other and confronting each other and said lens member, said single reflector member being rotatable about the optical axis of said lens member and the planes of said reflector surfaces intersecting along a line intersecting said lens member optical axis and perpendicular thereto, means for twining said reflector member about said lens member optical axis between 90° angularly related positions in accordance with said opposite scanning directions and a semireflector member located across and at an angle to said optical axis, said reflector member, semireflector member and lens member being so located and oriented that light rays from successively scanned increments of said original traverse said semireflector member and said lens member and are reflected by said reflector member back through said lens member to said semireflector member and are directed by said semireflector member and focussed onto said substrate.

* * * * *